United States Patent
Damera-Venkata

(10) Patent No.: US 7,365,883 B2
(45) Date of Patent: Apr. 29, 2008

(54) DITHER MATRIX DESIGN USING SUB-PIXEL ADDRESSABILITY

(75) Inventor: Niranjan Damera-Venkata, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 745 days.

(21) Appl. No.: 10/754,175

(22) Filed: Jan. 9, 2004

(65) Prior Publication Data

US 2005/0152005 A1 Jul. 14, 2005

(51) Int. Cl.
*H04N 1/405* (2006.01)

(52) U.S. Cl. ...................... 358/3.13; 358/1.9

(58) Field of Classification Search .......... 358/1.9, 358/3.07, 31, 3.13–3.19, 3.22, 466, 535
See application file for complete search history.

(56) References Cited

U.S. PATENT DOCUMENTS

| | | | |
|---|---|---|---|
| 4,814,886 A | 3/1989 | Kuge et al. | |
| 5,317,418 A | 5/1994 | Lin | |
| 5,541,743 A * | 7/1996 | Shiomi et al. | 358/534 |
| 5,742,703 A * | 4/1998 | Lin et al. | 382/176 |
| 6,172,773 B1 | 1/2001 | Ulichney | |
| 6,335,989 B1 | 1/2002 | Lin | |
| 6,710,778 B2 * | 3/2004 | Cooper | 345/596 |

FOREIGN PATENT DOCUMENTS

EP 0293214 11/1988

\* cited by examiner

*Primary Examiner*—King Y. Poon
*Assistant Examiner*—Nathan K Tyler

(57) ABSTRACT

A method of generating a dither matrix for an output device having sub-pixel addressability that permits the attenuation of tone for less than whole pixels. An original representative pixel grid is expanded to a super-resolution by replication of the pixel grid in both directions by the sub-pixel factor S. Halftoning methods for generating dither patterns are then applied using the super-resolution grid to create dither or filter outputs, which are converted to a corresponding output for a sub-pixel resolution grid. Selection of location for incremental addition (deletion) of tone is made using the sub-pixel grid output. The cycle of output generation, conversion to sub-pixel resolution, and tone modulation selection is repeated iteratively until a desired gray level is reached. The process is further repeated for each desired gray level to produce the multiple dither patterns that comprise the desired dither matrix.

18 Claims, 7 Drawing Sheets

PIXEL, SUB-PIXEL AND SUPER-RESOLUTION GRIDS AND CONVERSION BETWEEN THEM FOR THE CASE WHEN A SINGLE PIXEL IS MADE UP OF TWO HORIZONTAL SUB-PIXELS.

DITHER MATRIX DESIGN USING SUB-PIXEL ADDRESSABILITY

BACKGROUND OF THE INVENTION

1. Field of the Invention

This invention relates generally to halftone images, and more particularly to methods of generating dither arrays for use with output devices having sub-pixel addressability. The techniques may be implemented in an apparatus, as methods, or as programs of instructions for directing an apparatus or machine to carry out the processing steps of these techniques.

2. Description of the Related Art

Many image rendering technologies, referred to generally herein as output devices, have only binary outputs with respect to any one particular element or pixel, whereby each pixel of the image either has a dot printed or not printed. Input or source images, however, may have a gray scale of much greater depth, most typically 256 different tones (0 through 255) defined by 8 bits associated with each pixel. Thus, for an output device to render a gray scale image, it is necessary therefore to convert source images comprised of higher order gray levels into halftone images.

(A pixel is just one location on the addressable grid, whereas a dot generally refers to a physical positive rendering or inking which can be composed of any number of contiguous pixels, meaning one, two or more contiguous (or closely proximate) pixels form a single dot. In order to avoid confusion and assist the reader in more fully appreciating the present invention, in the present description "pixel" or "sub-pixel" and similar terms such as "grid" will be used to refer to the addressable locations; whereas "pixel-dot" will refer to a single printed or turned on pixel and "dot" will be used in referring to printed clusters of more than one pixel.)

The problem of representing gray scale images on a binary output device is known as "dithering" or "halftoning." Halftoning creates the illusion of continuous tone images by judicious arrangement of binary picture elements, simulating the continuous tone image. Dithering relies on the fact that the human visual system integrates information over spatial regions, so that a pattern of light and dark evoke a sensation approximating that of a uniform gray area even when the individual display element can be resolved. In other words, it is the human eye that averages out these dots and creates a grayscale. Effective digital halftoning or dithering can substantially improve the quality of rendering images.

There are many known methods for halftoning, one of which is known as screening. The simplest form of screen is a single threshold value such as 128, and in applying this threshold to the original image a comparison is made with each pixel such that anything above 128 is set to 1 and anything below is set to zero. (Though purely a matter of convention, for the purposes of this description, a "1" represents a printing or existence of a dot in the binary halftone, and "0" represent an empty or omitted dot). However, basic single-level thresholding is prone to graininess and other deficiencies and generally does not create a very pleasing image in comparison to other methods.

Since basic thresholding techniques were first developed, many improved and alternate methods have been designed. One method transforms a gray scale image to a halftone image by means of a dither matrix. The dither matrix occupies a physical space and has numerous elements, each with an individual value. The dither matrix is mapped over the image to generate the halftone by a comparison of each pixel with the dither matrix value which overlays it. For a gray scale image that is larger than the dither matrix, the dither matrix is replicated or tiled to cover the entire image. As a result, the halftone image created has the same number of gray level patterns as the number of gray levels in the gray scale image. A darker area in the gray scale image is represented in the halftone image by gray patterns with more dots.

In order to generate a halftone images using the above method, the dither matrix must be carefully designed: a fully random pattern would create a halftone image that is noisy, corrupting the content of the image. Accordingly, the values associated with each pixel or address of the dither matrix are assigned specific thresholding values associated with the desired ordering and location in which pixels will be turned "on" as tone is added from one gray level to the next.

One prior art method of designing a dither matrix is known as the void-and-cluster method. A general discussion of this method can be found in "The Void and Cluster Method for Dither Array Generation" by Robert Ulichney, published in IS&T/SPIE Symposium on Electronic Imaging: Science and Technology, San Jose, Calif., 1993.

Another method of generating dither patterns or "screens" is found in "Perception of binary texture and the generation of halftone stochastic screens" by J. Dalton, published in IS&T/SPIE 1995 International Symposium on Electronic Imaging: Science and Technology, San Jose. Calif., 1995.

Another dither matrix approach is described in U.S. Pat. No. 5,317,418, "Halftone Images Using Special Filters" which is incorporated by reference herein. This approach, stochastic in nature, produces scattered dots resulting in very uniform patterns in the absence of dot-to-dot interactions in the printing engine.

Also, yet another variety of filtering to produce dither patterns and related matrixes is described in U.S. Pat. No. 6,335,989, "Halftone Printing Using Donut Filters", which is also incorporated by reference herein.

However, one shortcoming common to conventional dithering techniques is that they are designed to operate on a pixel grid having substantially symmetric resolution. Certain output devices have a degree of sub-pixel addressability that provides an additional degree of resolution, typically greater in one direction of the pixel grid than the other. For instance, some laser printers may have a horizontal sub-pixel resolution of 2, 3 or more sub-pixels of resolution or addressability for every pixel. Accordingly, for known methods of halftoning developed to operate on a substantially symmetric grid design, use of sub-pixels can create problems and/or, most notably, the benefits of higher resolution attendant to sub-pixels are not fully recognized.

One advantage of using addressable sub-pixels in rendering halftone images is that it allows the addition of tone to be distributed among multiple other pixels or dot clusters. For example, an output device without sub-pixel addressability (or having it but unable to utilize it without a method of generating halftones for controlling the distribution of the sub-pixels) would be limited to applying additional tone by adding single whole pixels at a time. Conversely, the ability to address sub-pixels has the advantage of allowing the addition (or deletion) of tone from one graylevel to the next such that tone of even a single pixel dot value can be distributed among multiple other pixels or dot clusters.

What is needed is a technique that enables the design of dither matrices for creating half tone images that can take advantage of sub-pixel addressability of certain output devices, even in circumstances where the sub-pixel resolution is asymmetric. Moreover, and particularly desirable, is a solution allowing for the use of sub-pixel resolution using known or conventional dither matrix design methods that work on symmetric grids; thus, a solution having a way of applying such known methods to the asymmetric grids inherent of sub-pixels.

SUMMARY OF THE INVENTION

The present invention provides a method of generating dither matrices for converting from a gray scale image to a halftone image with sub-pixel characteristics, and doing so using known dithering matrix design methods. The invention involves the use of an intermediate, hypothetical, super-resolution grid. The super-resolution grid is used as a means of extending conventional dither matrix generation methods to the design of dither patterns for output devices having sub-pixel addressability.

In the case of a sub-pixel resolution of S sub-pixels per pixel extending in one direction, the size of a super-resolution grid to be created is directly determined from the original grid multiplied by the factor S in both directions. The dither outputs are generated for gray levels on the super-resolution grid using conventional methods, which are then converted to sub-pixel grid by averaging down the super-resolution grid by factor S along the direction of the pattern that does not have sub-pixel resolution. Dither outputs or filter outputs are processed versions of a dither pattern corresponding to a particular gray level. Such outputs are used in determining incremental tone modulation, i.e. the selection of where to add or delete tone to create the desired grayscale. Thus, according to one embodiment of the present invention ultimate selection of which sub-pixel(s) to modulate is made on the sub-pixel grid pattern using the dither output converted from the super-resolution grid. The resulting sub-pixel grid is asymmetric in size, corresponding (1) directly to the original grid dimension in the direction without sub-pixel addressability, and (2) by a factor S larger than the original grid in the direction in which sub-pixel resolution exists. Accordingly, when a half-tone image is printed, it will appear dimensionally correct in relation to the original grid, because the sub-pixels are narrower by the same factor S.

Accordingly, in one embodiment of the invention, a sub-pixel grid and super-resolution grid are created for an original pixel grid, and the dither outputs are generated based on the super-resolution grid. Subsequently, such output of the super-resolution grid is converted to the sub-pixel grid by averaging down from the super-resolution grid size to achieve the corresponding sub-pixel grid size.

In another embodiment of the invention a dither matrix is created from the combination of a first subset of dither patterns, corresponding to certain light tone gray levels, created using conventional dithering methods applied to the regular pixel grid, and a remaining subset of dither patterns generated using a super-resolution grid. The first subset of dither patterns generated on the regular pixel grid are than scaled up to the size of a sub-pixel grid by replication of cells in the direction of the sub-pixel resolution by a factor S, which is the resolution of sub-pixels per pixel. The second, remaining subset of dither patterns are generated using the super-resolution grid to iteratively create dither outputs which are converted to the sub-pixel grid by averaging down the size of the super-resolution grid by factor S in the direction not having sub-pixel resolution/addressability, whereupon such converted outputs are used to find the best location for adding (deleting) for each additional sub-pixel modulation of tone. Through the iterative generation of dither outputs on the super-resolution grid and addition/deletion of tone on converted sub-pixel outputs, the desired set of dither patterns are obtained for each desired gray level and of the appropriate sub-pixel resolution. The two subsets of dither patterns, now of a common dimensional scale, that of the sub-pixel grid, are combined to create a complete dither matrix for N level grayscale.

Accordingly, an object of the present invention is to create a grid system that can be used to modulate the addition or deletion of sub-pixels by any known or conventional dither matrix design method that uses symmetric pixel grids. By known or conventional dithering methods what is meant is any number of dithering techniques that operate on a symmetric grid in generating an output dither matrix, such that use of the present invention will allow for such method to be used in asymmetric sub-pixel addressability applications.

DESCRIPTION OF THE DRAWINGS

The present invention is described with respect to particular exemplary embodiments thereof and reference is made to the drawings in which.

DETAILED DESCRIPTION OF THE INVENTION

A method of generating a halftone image for an output device, most notably printer devices, having sub-pixel addressability is disclosed. A digital output device, for example and without limitation, a laser printer, can for each individual addressable pixel either print a dot or not print a dot: it is a binary 1 or 0 process. And each pixel is just one location on an addressable grid. Some devices, however, have a greater level or degree of resolution in one direction (e.g., horizontal) than in the other direction (e.g., vertical) resulting from addressability at the sub-pixel level.

Figure 1A:
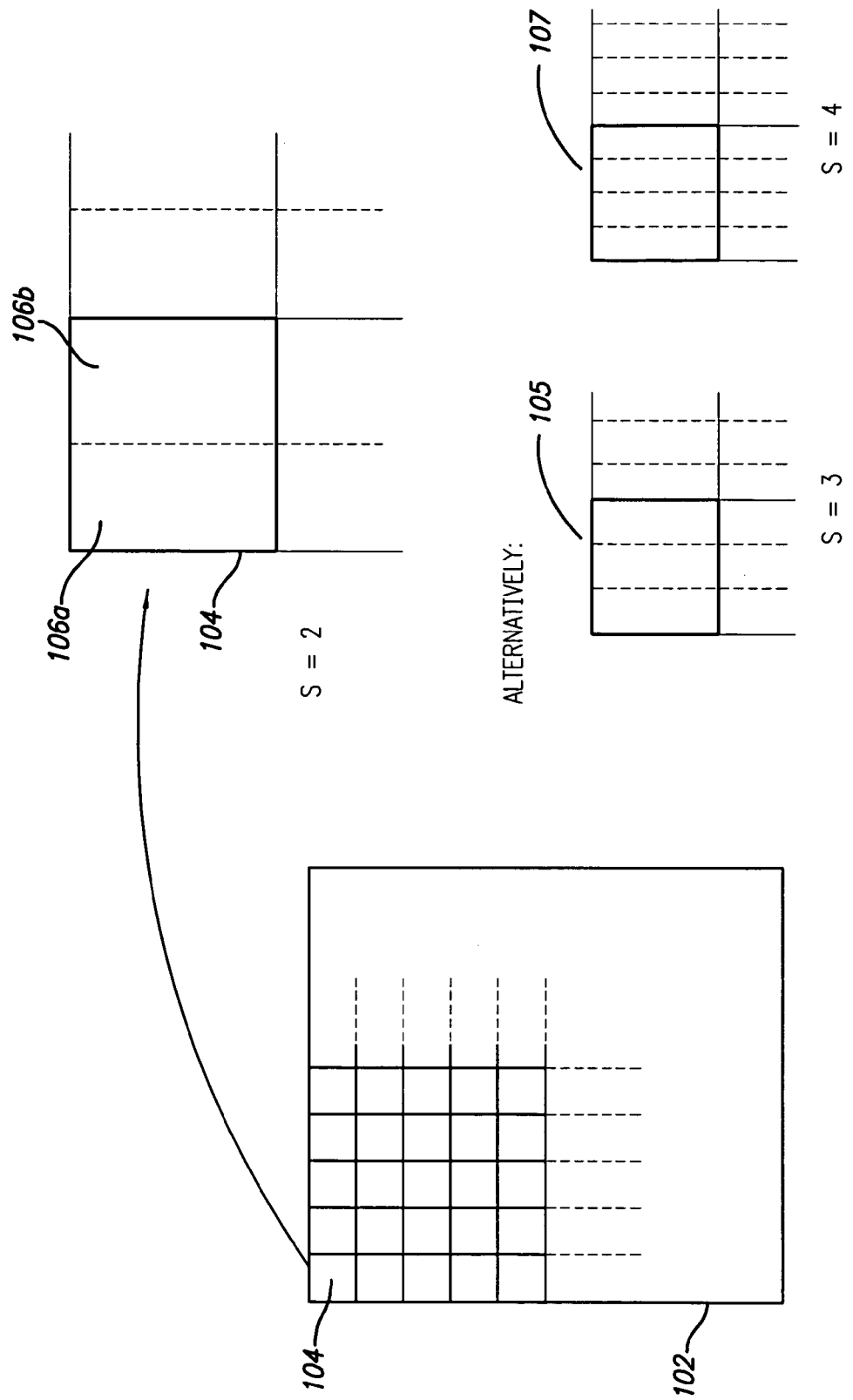
FIG. 1A shows an example of the relation of sub-pixel resolution on a generic pixel grid. shows a schematic of a super-resolution grid according to the present invention.

In FIG. 1A a pixel grid 102 has a plurality of pixels across its surface, and each individual pixel 104 has a greater resolution or addressability in the horizontal direction, such that each pixel 104 is comprised of sub-pixels 106a and 106b. Thus, any particular device may have a level of sub-pixel addressability whereby each pixel is comprised of S sub-pixels that represent a factor of resolution in the direction of the sub-pixel addressability. For grid 102; each pixel 104 has two sub-pixels, thus a sub-pixel factor S=2. However, it should be noted that other orders of resolution or sub-pixel factors may be employed, as for example, alternative pixel grids 105 and 107 show grids with sub-pixel factors, S, of 3 and 4, respectively.

Figure 1B:
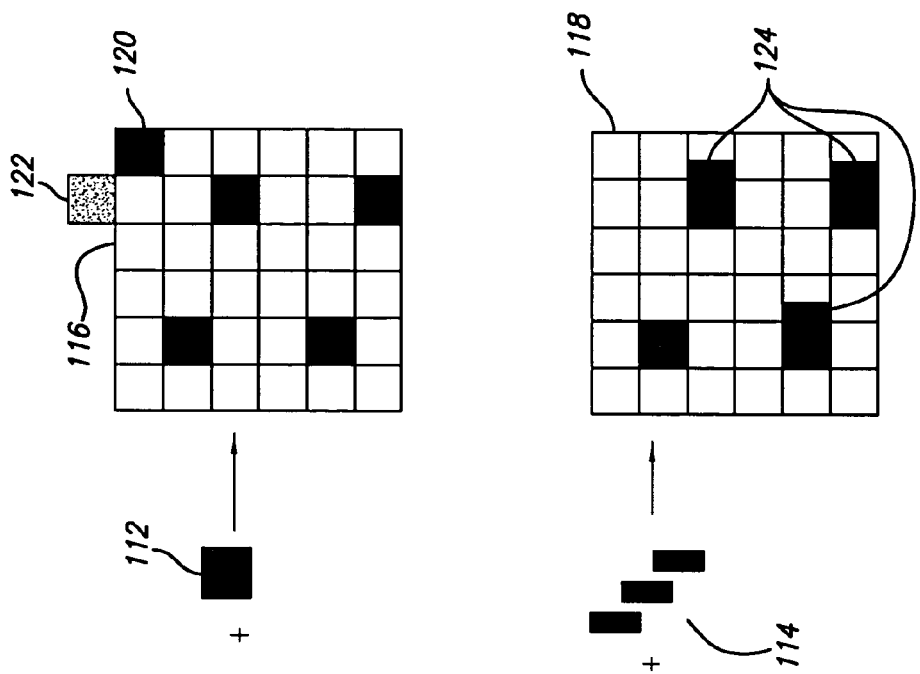
FIG. 1B shows an example of the different effect in applying tone using sub-pixels versus conventional whole pixel tone modulation.

FIG. 1B shows pixel grid 108 which represents a current graylevel with certain of its pixels printed black, indicated, for example, as pixel 110 (and other analogous pixels in grid 108). When implementing halftoning techniques, an advantage of sub-pixel addressability is that it allows improved tone modulation, the addition (or deletion) of tone to thresholding screens from one graylevel to the next such that tone modifications can be distributed among multiple other pixels or dot clusters. In generating screens for additional grayscales, it is commonly the case that the next grayscale is made from the addition of one or more pixels to the then current grayscale pattern. Thus, with conventional application of known methods, pixel grid 108 can add additional pixel 112 to create an incremental grayscale screen 116. However, this has some disadvantages associate with the choice of where to add pixel 112. It can be seen there is no place on grid 108 that pixel 112 can be added in creating grid 116 in which it does not touch another pixel, which may result in potentially undesirable clustering or patterning. For instance, even if pixel 112 is placed at location 120 (and we assume that pixel grid 108 and its dotted pattern is continuous or tiled edge-to-edge) then there is another pixel-dot 122 with which added pixel-dot 120 is contiguous. And, in the case of printing engines where dot-to-dot interactions are present, such as in laser printers, by way of example, such interaction can produce patterns that are rough and grainy.

Conversely, using sub-pixels, the same tone can be added but distributed among several other pixel-dots. So, for comparison, in FIG. 1B, there are shown at 114 three sub-pixels equal to one pixel (i.e., S=3); thus, the sub-pixels shown at 114 represent the same tone of single pixel dot 112. However, in adding the equivalent tone of a single pixel-dot to screen 108 to create 118, sub-pixels 114 can be distributed among the three different points indicated at 124. Thus, with sub-pixels, the same additional tone of a single pixel can be added in a distributed fashion among several dot clusters (in this case among three different pixel clusters), creating a smoother attenuation of tone from one gray scale to the next.

In addition to distributing the same tone of a single pixel, using sub-pixels it is also possible to employ a finer level or granularity in simulating a grayscale by adding less than a whole pixel: it is not required that multiples of sub-pixels equaling whole pixels be used as just described. Rather, single sub-pixels can be incrementally added in developing screens appropriate to a particular grayscale. Thus, tone can be attenuated at the sub-pixel level by modulating the addition (or deletion) of tone a single sub-pixel at a time. FIG. 1B finally shows screen 126 which has been incremented from screen 118 by adding a single sub-pixel 128. In either case (adding multiples of whole pixels or single sub-pixels), as a result, any error is more diffused resulting in a smoother halftoning result.

It should be noted for clarity that pixel dot 122 and sub-pixel dot 128 are shown in a lighter shade for highlighting there locations to the reader, and it should be appreciated that in the present description the pixels and sub-pixels referred to are binary outputs (either a dot or no dot), and the use of shaded elements is for illustrative purposes only.

Figure 2:
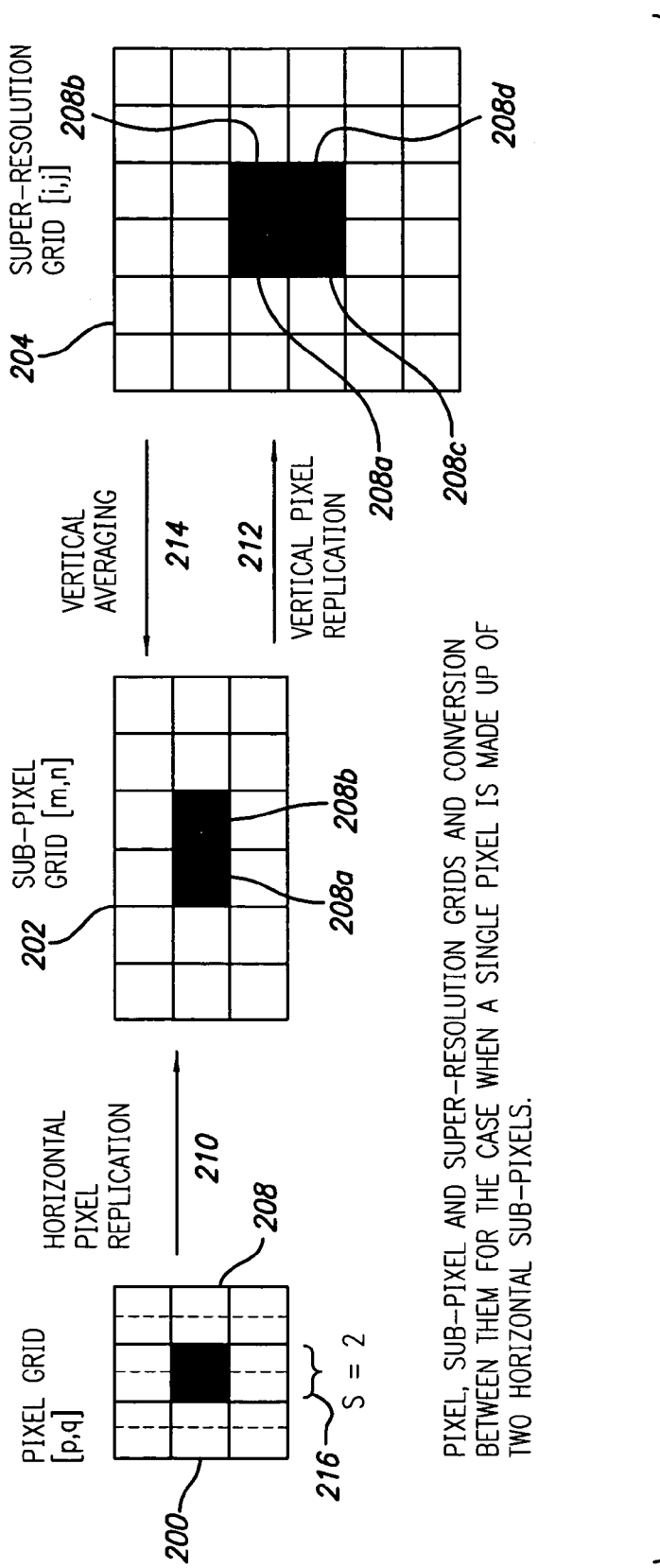
FIG. 2 shows the relationship between a representative pixel-grid [p,q] and corresponding sub-pixel grid [m,n] and super-resolution grid [i,j]

FIG. 2 shows pixel grid 200 characterizing an original pixel grid dimensionally. In this example, the output device or ultimate rendering method has a sub-pixel resolution and addressability in the horizontal direction of two sub-pixels per pixel, or S=2, as indicated at 216. Accordingly, the pixel grid 200 needs converting to an appropriate sub-pixel grid 202 and super-resolution grid 204 to resolve the sub-pixel factor. The use of a sub-pixel factor S=2, as persists through the example of FIG. 2, is by way of example only, and alternative embodiments and implementations of the present invention may use any variety of sub-pixel factors as is indicated by the circumstances of the then-immediate application.

Pixel grid 200, defining a physical space [p,q], is converted to a corresponding sub-pixel grid 202. Specifically, and with reference to the example of FIG. 2, with S=2, sample pixel 208 is replicated horizontally to create sample sub-pixels 208a and 208b, and this is done for all pixels of pixel grid 200. In converting, pixel grid 200 to sub-pixel grid 202, the space [p,q] is mapped to a new space [m,n] by replicating the pixel grid according to the sub-pixel factor S. Replication is essentially the multiplication of the grid in a direction whereby the value held by each individual pixel is duplicated or "replicated" a number times, creating a set of S replicated cells along the direction of replication in the newly formed grid for each former individual pixel.

Importantly, the replicated pixel addresses, or cells, and their values are extended in the replication process longitudinally along the direction of replication, such that each subset of replicated cells corresponding to a specific replicated pixel are contiguous. For example, in FIG. 2, in the horizontal replication step from pixel grid 200 to sub-pixel grid 202, each pixel is replicated by a multiple of 2. Specifically, sample pixel 208 is filled, representing a value of "1", and replication results in two cells, 208a and 208b, in sub-pixel grid 202 having the same value (i.e., they are filled). Moreover, the replication process extends these two cells along the direction of replication (in this example horizontally) and the two cells are contiguous. This process is the same for all pixels of grid 200 when replicated to generated sub-pixel grid 202, regardless of the value of the particular pixel or cell; it is only for the point of example in this description of the replication step that attention is pointed specifically at pixel 208 and corresponding cells 208a and 208b.

The replication step 210 just described is directly analogous, then, in creating the super-resolution grid 204, by replication step 212. In referring again to FIG. 2, with attention drawn to example pixel 208, when replicating in the vertical direction from sub-pixel grid 202 to super-resolution grid 204, the value of original pixel 208 is again duplicated and extended in the direction of replication, this time vertically, as cells 208c and 208d. Again, the replicated cells are contiguous. It is important to note that, although FIG. 2 demonstrates the replication of pixel grid 200 in a first direction to create sub-pixel grid 202 and then replication of sub-pixel grid 202 in a second direction to create super-resolution grid 204, one can generate the super-resolution grid 204 directly from pixel grid 200 by replicating and extending grid cells in both direction simultaneously. It is purely by way of example and without limitation that FIG. 2 depicts the relation between grid 200, sub-pixel grid 202 and super-resolution grid 204, and the various relations of the three grid forms will be evident to one skilled the art.

Another step depicted in FIG. 2 is that of averaging down in order to transcribe from super-resolution grid 204 to obtain a sub-pixel grid 202. In the example shown, this is indicated as vertical averaging 214 in which the resolution of the super-resolution grid 204 is reduced in the vertical direction, resulting in the appropriate resolution of sub-pixel grid 202. Averaging down, or vertical averaging as shown at 214, is the step of condensing the values held in multiple adjacent cells (along the direction being condensed or averaged down) to a reduced number of cells or single sub-pixel. It should be reminded that the reference to "vertical" averaging in FIG. 2 is only by example and the concept of "averaging down" can be made in any appropriate direction to reduce the resolution of a super-resolution grid to that of the sub-pixel grid. Thus, "down" refers to reducing the number of addressable spaces or cells, and "averaging" indicates any number of known methods of obtaining a single value from several values, for example, reducing from the two adjacent and aligned (along the direction of reduction/averaging) cells 208a and 208c of grid 204 to the single cell 208a of grid 202. Averaging may be a simple calculation of mean value (sum of the values divided by the number of values), it may be a weighted averaging, or it may be any number of more involved methods that takes into consideration various factors. One such factor might be, by way of example and without limitation, specific techniques used to account for repeated rounding errors commonly associated with averaging even numbers of binary values.

Sub pixel grid 202 demonstrates visually the asymmetry of the addressable grid [m,n] as it relates to the physical space [p,q]. This asymmetry inhibits use of conventional screening techniques that are unable, using heretofore known methods, to make use of sub-pixel addressability. However, as shown in FIG. 2, the asymmetry is managed by creating a super-resolution grid 204 representing space [i,j], which corresponds to the sub-pixel grid 202 and also, necessarily, to pixel grid 200. And by the methods of replication and averaging down just described, it is possible to convert between grid 200, 202, and 204. It is essential, then, that the super-resolution grid ultimately created be an isometric grid space [i,j] which is substantially dimensionally equivalent in both directions to the real space [p,q] times the sub-pixel factor S. Thus the super-resolution grid represents equal distances in the grid, which allows for the use of conventional screen generation techniques, and subsequently conversion back to sub-pixel grid [m,n] dimensions for ultimate modulation and application of tone at the sub-pixel level.

Figure 3:
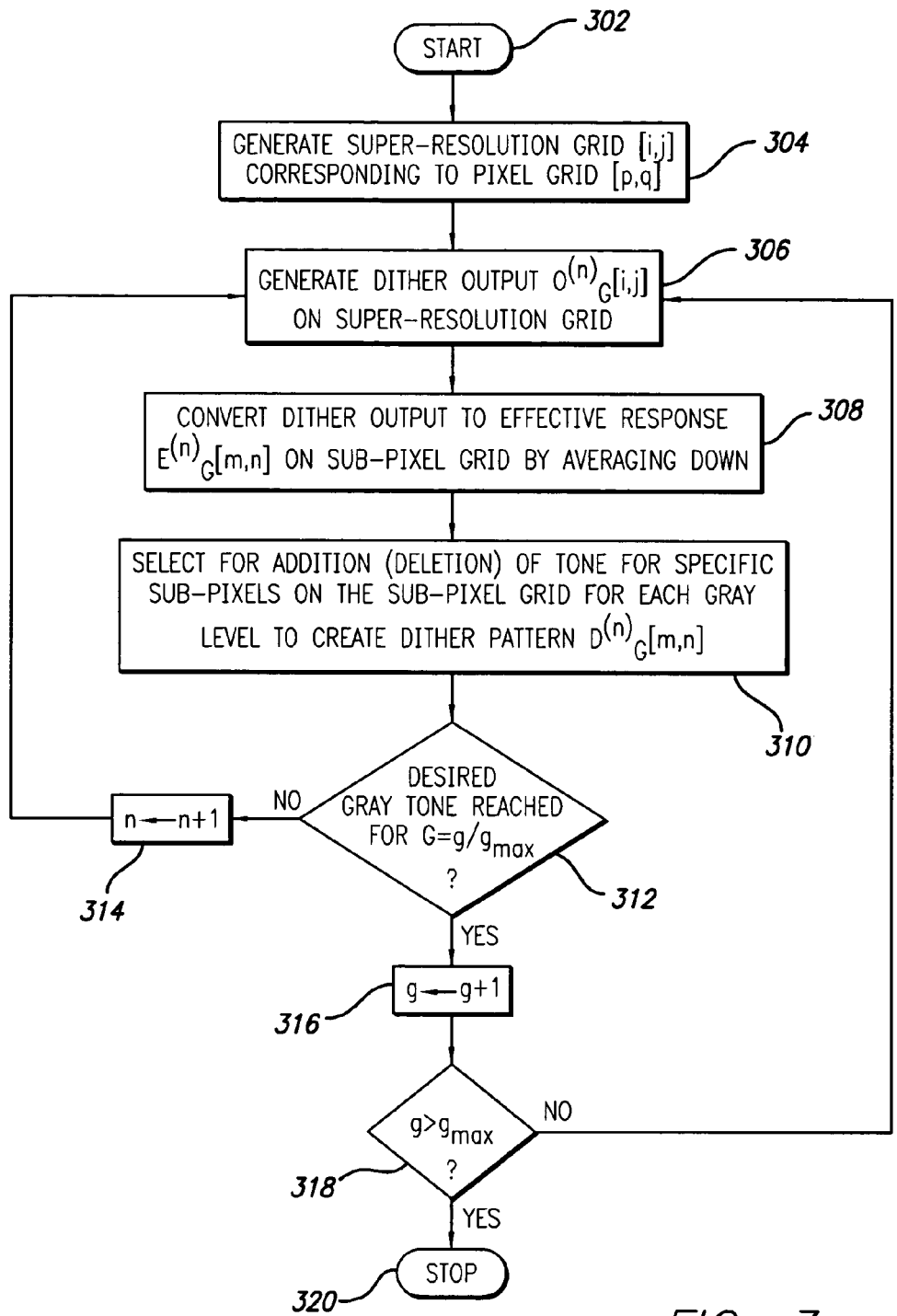
FIG. 3 is a flow diagram for generating a dither matrix according to the present invention.

One method of forming dither matrixes using super-resolution grids is shown in FIG. 3. In this approach, a start state 302 begins with a grayscale image with dimensions a pixel grid [p,q] and a binary output device for which dither matrices are to be formed, the output device having a sub-pixel addressability of S sub-pixels per pixel in a first direction, which sub-pixel addressability does not extend in the orthogonal second direction. At step 304, a super-resolution grid [i,j] is generated corresponding to pixel grid [p,q] by extending through replication pixel [p,q] in the first direction of sub-pixel addressability, as well as in the second, orthogonal direction not having sub-pixel addressability.

In step 306, initial dithering outputs $O_G[i,j]$ are generated for desired gray levels $G=g/g_{max}$ on super-resolution grid [i,j] using any of many known dither design methods. A dither output or filter output is a processed version of a dither pattern corresponding to a particular gray level. Thus output $O_G[i,j]$ is essentially a processed version dither pattern for a gray level on the super-resolution grid, however such output must be converted to a sub-pixel scale in order that choices can be made at the sub-pixel level as to which specific location(s) are to be modulated in adding (deleting) tone. Accordingly, output $O_G[i,j]$ is converted at step 308 to an effective response $E_G[m,n]$ on the sub-pixel grid by averaging down the dither output in the second direction. Having $E_G[m,n]$ now at a sub-pixel level, selection is then made at 310 as to the specific location of tone modulation made (by the addition (deletion) of tone) to specific sub-pixel(s). If at check 312 the desired pixel concentration is not yet reached for the subject gray level $G=g/g_{max}$, then the process returns via 314 to step 306 to generate another incremental dither output, which is converted to a sub-pixel response at 308, and is then used at 310 in again selecting the location of the next incremental addition/deletion of tone. This process continues iteratively until the desired concentration is reached for the subject gray level $G=g/g_{max}$, as determined at check 312.

When the desired tone is achieved for a specific gray level G (i.e., a positive true response 312), then the gray level is incremented at 316 in order that dither patterns can be generated for the next desired gray levels $G=g/g_{max}$ by way of generating outputs on the super-resolution grid, which are converted to a sub-pixel resolution for selection of tone modulation. This recursive process continues (incrementing from one gray level to the next) until dither patterns have been generated for all desired gray levels, as tested at 318. Thus, for each gray level, the successive addition (or deletion) of tone for a gray level is iteratively cycled through steps 306, 308 and 310 (by return path 312 and 314) until the desired gray level concentration is reached, resulting in a dither pattern for the subject gray level; and, this in turn is repeated for all desired gray levels (by loop path 316 and 318), such that the final desired dither matrix $D_G[m,n]$ is ultimately produced. The resulting dither matrix $D_G[m,n]$ is isotropic and printable in the real dimensions it represents, even though it is an asymmetric array, because when output or printed the array elements corresponding to sub-pixels, though more numerous by factor S, are fractional elements of pixels in real dimensions of widths 1/S.

Figure 4:
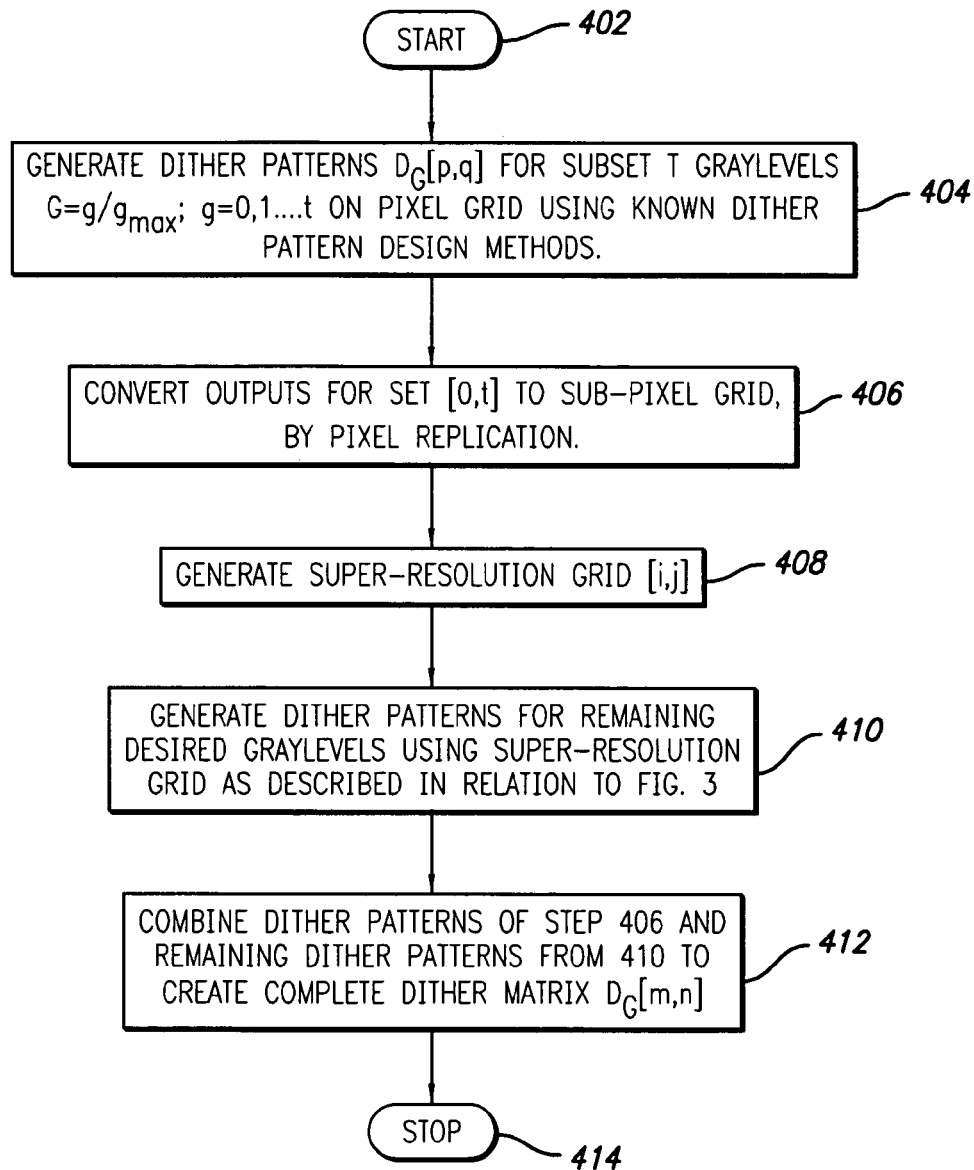
FIG. 4 is a flow diagram another variation of generating a dither matrix according to the present invention.

An alternate method of using sub-pixel addressability by way of super-resolution grids to generate dither matrices is shown in FIG. 4. In this example, start state 402 is analogous to step 302 of the previous example of the invented method: principally there is an N-level grayscale image of pixel grid dimensions [p,q], and desired rendering resolution having addressable sub-pixels in a first direction that results in sub-pixel array [m,n] that is asymmetric, owing to a sub-pixel factor S in the first direction that does exist in the alternate second, orthogonal direction.

However, unlike the method shown in FIG. 3, the presently described method commences at step 404 by generating dither patterns $D_G[p,q]$ on the original grid [p,q] for a predetermined subset t of N of the total desired graylevels (i.e., g=0, 1, 2 . . . t; $G=g/g_{max}$) using known dither pattern design methods. This subsetting may be based on any number of reasons, one of which may be the realization that isolated sub-pixels tend to drop out or otherwise reproduce poorly, so tone is best added to light graylevel in whole pixels only (because dot clustering is not yet predominant). Accordingly, in some applications there may be a determinable and appropriate set t, or range for t, in which application of conventional screening methods are sufficient without regard to sub-pixel resolution. These initial dither screens $D_G[p,q]$ for g=[0,t] are subsequently converted by replication to sub-pixel grid resolution at 406, which will later be combined at step 412 with the dither screens of the remaining gray levels generated on a super-resolution grid at steps 408 and 410, which when combined will create a single dither matrix $D_G[m,n]$.

Steps 408 and 410 are analogous steps of the previous drawing FIG. 3. Super-resolution grid [i,j] is generated at step 408. Using this super-resolution grid, dither outputs $O_G[i,j]$ are created, though only for the remaining desired grayscales (of the set N-t) for which dither patterns were not originally generated on the pixel grid [p,q]. The dither outputs are converted to sub-pixel scale patterns by averaging down along the direction of the grid not having sub-pixel resolution, so as to generate effective response $E_G[m,n]$. These sub-pixel outputs are then used to make specific choices of tone modulation at the sub-pixel level. And as, for FIG. 3, these steps are iteratively repeated (modulating sub-pixel tone) for each gray level until the desired tone concentration is reached for each subject gray level. Since the final dither patterns resulting from step 410 are a subset of the remaining desired dither pattern not generated at step 406, the two subsets of dither patterns are combined at step 412 to create a complete set of dither patterns for all desired gray levels.

It is important to note that there are other reasons evident to one skilled in the art that would suggest a grouping of a subset (t) of the total grayscale, and the example of light tones due to isolated sub-pixel dropout is but one example of the application of such possible subsetting.

Figure 5:
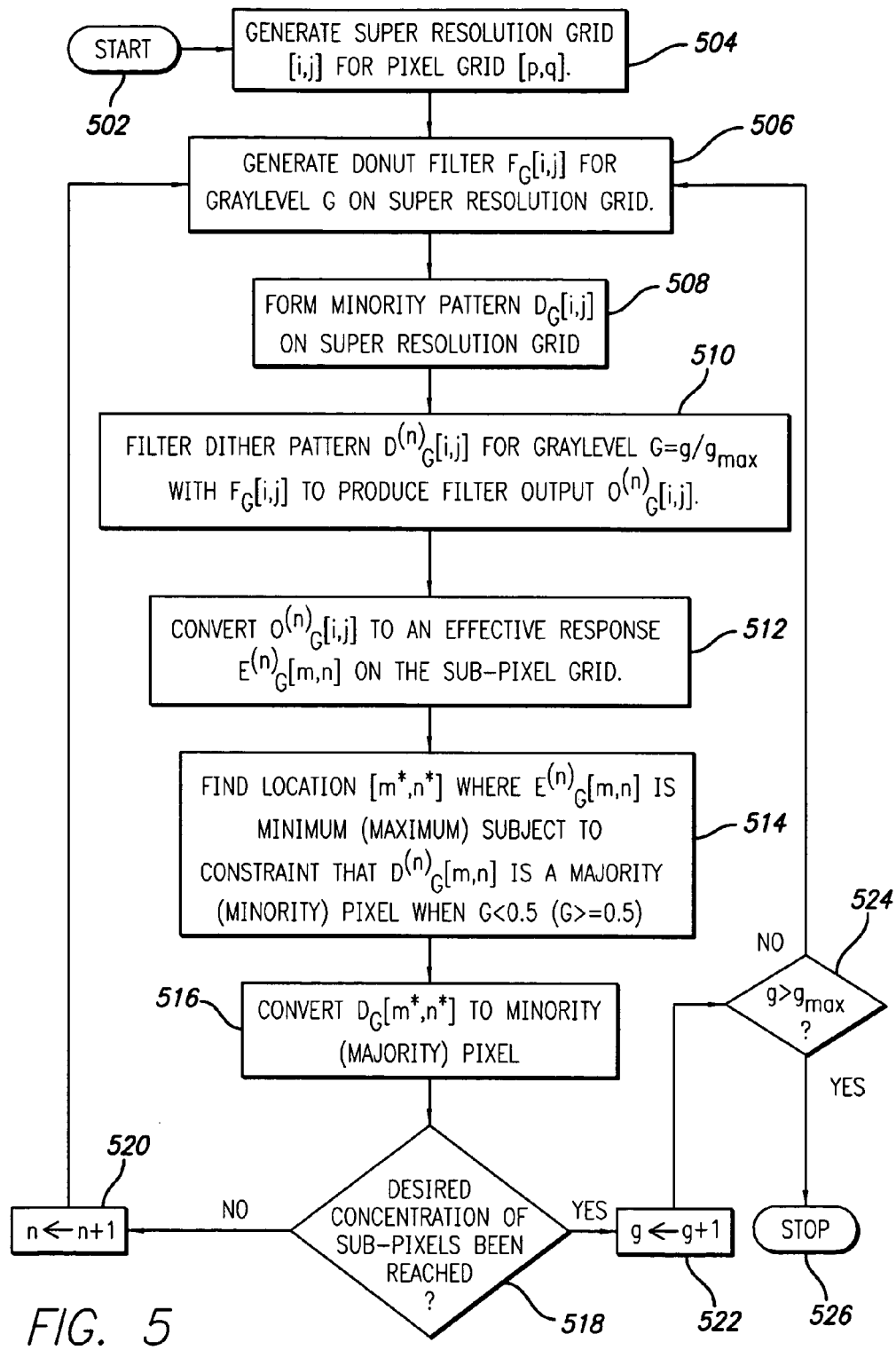
FIG. 5 is a flow diagram of a preferred embodiment of the present invention using a donut filter.
Figure 6A:
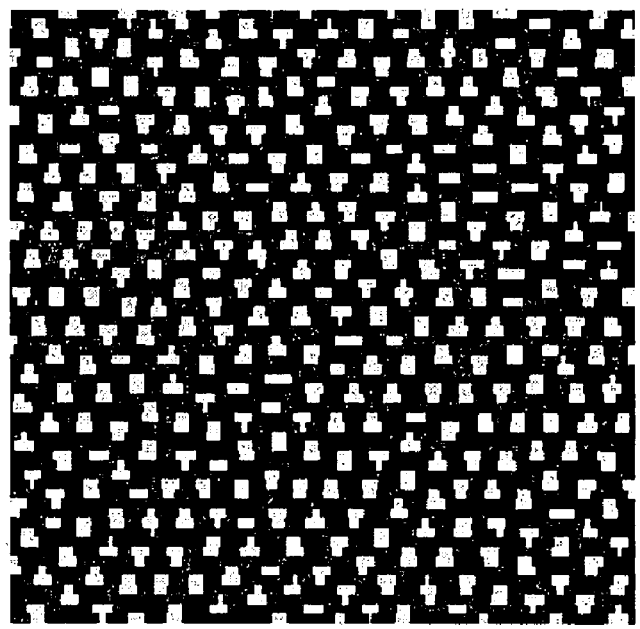
FIG. 6A shows a halftone image on a super-resolution grid generated according to the present invention using a donut filter.
Figure 6B:
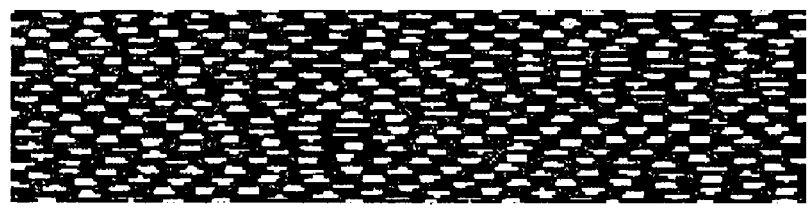
FIG. 6B shows a halftone image on a sub-pixel grid correlating to the super-resolution grid of FIG. 6A, generated according to the present invention using a donut filter.

One specific method of forming dither matrices uses what is know as donut filters and FIG. 5 shows, specifically, a method implementing the present invention using donut filters. Donut filtering methods generally are described in U.S. Pat. No. 6,335,989, "Halftone Printing Using Donut Filters", which is incorporated by reference herein. Thus the following description is not intended as a complete description of known donut filtering methods, rather as an example of the application of at least one known dither matrix design methods, that of donut filters, in creating a dither matrix using the present invention.

Referring now to FIG. 5, in this approach, as with previously described examples, a start state 502 exists analogous to start states 302 and 402. Similar to the method shown in FIG. 3, the super-resolution grid [i,j] is generated at 504, and that super-resolution grid is proportional to the input image of grid resolution [p,q] by a sub-pixel addressability factor, S. Employing donut filtering techniques, next at step 506 a donut filter $F_G[i,j]$ is generated on the super-resolution grid (Setting n=0, $G=g/g_{max}$) for a particular graylevel G. Next at step 508 a minority pattern $D_G[i,j]$ is formed on the super-resolution grid, which is then filtered at step 510 using the donut filter $F_G[i,j]$ generated at step 506 to produce a filter output $O^{(n)}_G[i,j]$.

Next, at step 512, the filter output $O^{(n)}_G[i,j]$, which is on the super-resolution grid, is converted to an effective response $E^{(n)}_G[m,n]$, which is on the sub-pixel grid [m,n]. This is achieved by averaging down the super-resolution grid in the direction not having sub-pixel addressability by the factor S. With the effective response, $E^{(n)}_G[m,n]$, it is possible next at 514 to find location [m*,n*] where the effective response is a minimum (maximum), subject to the constraint that $D^{(n)}_G[m,n]$ is a majority (minority) pixel when G<0.5 (G>=0.5). This then leads to step 516 where the appropriate minority pixel [m*,n*] is converted to a majority pixel, e.g., $D_G[m*n*]=1$ (where 1 represents a dot).

Having progressed through to step 516 to select the location of adding (or deleting) the next sub-pixel element, a check is then made at 518 whether the desired concentration of tone has been achieved to form the current gray level G ($G=g/g_{max}$). If in the affirmative, then the process proceeds to increment the gray level at 522, and either stop at 520 (if $g>g_{max}$) or return to step 506 to begin processing and filtering the new current gray level. In the alternative, if the desired concentration of sub-pixels have not been achieved after step 516 for the then-current gray-level, as checked at step 518, then the process returns to step 506 to again generate and filter the minority pattern (steps 506 through 510) to find the next location to add a sub-pixel dot (514 and 516). This cycle of attenuating the addition of tone by sub-pixel continues until the current graylevel G is achieved (as tested at 518). And, ultimately, by systematically incrementing g through $g_{max}$ (i.e., step 522) until the desired tone is achieved for each desired graylevel G.

It will be appreciated by one skilled in the art the foregoing described method has many variations. For example, the methods described in FIGS. 3 and 4 are generally iterative in nature (not unlike that described with respect to FIG. 5) and depend in some part on the dither design technique being used, such that a repeated cycling is utilized to allocate or modulate tone by sub-pixels until the desired concentration is reached for a particular grayscale. One variation would be to combine the concept from FIG. 4 (that of generating only a subset of dither patterns using super-resolution grids, the remainder produced by another method) with the example of donut filtering techniques shown in FIG. 5, or alternative filtering techniques generally. Another variation might be, as a specific application or circumstances may call for, to use two or more subsets of gray levels (rather than just the one subset t described in relation to FIG. 4) which subsets are not contiguous. These and other modifications and variations may be employed without departing from the inventive elements herein described, as one skilled in the art will appreciate in practicing the disclosed invention. Thus, the foregoing detailed description of the present invention is provided for the purpose of illustration and is not intended to be exhaustive or to limit the invention to the precise embodiments disclosed. Accordingly, the scope of the present invention is defined by the appended claims.

What is claimed is:

1. A method of generating an N gray level dither matrix for an output device having sub-pixel addressability, the method comprising the steps of:
   a. creating a super-resolution grid [i,j] corresponding to a pixel grid [p,q];
   b. generating the dither matrix for a sub-pixel grid [m,n] using the super-resolution grid [i,j] by (1) generating a dither output on the super-resolution grid [i,j]; (2) converting the dither output [i,j] to an effective response on the sub-pixel grid [m,n]; and (3) using the effective response to modulate the addition or deletion of tone of at least one sub-pixel, wherein said dither matrix is comprised of a plurality of dither patterns, each corresponding to one of the N gray levels.

2. The method of claim 1 wherein the step of generating the dither matrix uses a donut filtering method.

3. The method of claim 1 wherein, for each of the N gray level, steps (1), (2) and (3) are repeated, iteratively, until the such gray level is reached as a result of the modulation of tone of one or more sub-pixels.

4. The method of claim 3 wherein the output device having sub-pixel addressability has a sub-pixel resolution factor S in a first direction [p] that does not extend in an orthogonal second direction [q] whereby step (a) comprises replicating each pixel of grid [p,q] by the factor S in the first direction and the second direction to create the super-resolution grid [i,j].

5. The method of claim 3 wherein the super-resolution grid [i,j] is substantially isotropic in relation to pixel grid [p,q] by a factor S.

6. The method of claim 5 wherein the step of generating the dither matrix uses a donut filtering method.

7. The method of claim 1 wherein step (2) further comprises averaging down in the [j] direction the dither outputs generated on super-resolution grid [i,j] to create the corresponding effective response on sub-pixel grid [m,n].

8. The method of claim 1 wherein the step of generating the dither matrix uses frequency modulation techniques.

9. A method of generating from a source N-level grayscale image a dither matrix for an output device, said output device having sub-pixel addressability of a factor S sub-pixels per pixel in a first direction [p], which sub-pixel addressability does not extend in a second orthogonal direction [q], the method comprising the steps of:
   a. generating dither patterns for a subset t of N gray levels on a pixel grid [p,q];
   b. converting the dither patterns generate in step (a) to a sub-pixel grid [m,n] by replication S times in the first direction [p];
   c. creating a super-resolution grid [i,j] by replicating pixel grid [p,q] by sub-pixel factor S in both the first and second directions;
   d. generating dither patterns of the remaining subset of (N-t) gray levels using the super-resolution grid [i,j], said generating step comprising, for each of the (N-t) gray levels, iteratively and until the gray level is reached as a result of the modulation of the tone values of one or more sub-pixels:
      i. (1) generating a dither output on the super-resolution grid [i,j],
      ii. (2) converting the dither output [i,j] to an effective response on the sub-pixel grid [p,q], and
      iii. (3) using the effective response to modulate the addition or deletion of tone of at least one sub-pixel; and
   e. combining the dither patterns of steps (b) and (d) to create the dither matrix on sub-pixel grid [m,n].

10. The method of claim 9 wherein step (d)(ii) of converting dither outputs to corresponding effective responses further comprises the step of averaging down in the [j] direction the dither outputs generated on super-resolution grid [i,j] to create the corresponding effective response on sub-pixel grid [m,n].

11. The method of claim 9 wherein one or more of the dither patterns generated in either steps (a) or (d) is made using frequency modulation techniques.

12. The method of claim 9 wherein one or more of the dither patterns generated in either steps (a) or (d) is made using donut filters.

13. The method of claim 9 wherein the subset t of N grayscales for which dither pattern are generated at step (a) on the pixel grid [p,q] substantially correlate to a set of light tone grayscales consisting primarily of isolated pixel dots.

14. A method of generating a dither matrix of resolution [m,n] for a source image having resolution [p,q], wherein the dither matrix corresponds to the source image by a sub-pixel factor S in the [p] direction and is substantially identical to the source image in the [n] direction, such that [p,q] maps to [m,n] as [m=S*p, n=q], the method comprising the steps of:
   a. creating a substantially isometric super-resolution grid [i,j] by replicating the source image in both directions S times, such that [i=S*p, j=S*q];
   b. generating using the super-resolution grid a plurality of dither patterns corresponding to a plurality of desired gray levels, whereby said generating step comprises, for each desired gray level: (1) producing a dither output on the super-resolution grid [i,j], (2) averaging down the dither output [i,j] in the [j] direction by factor sub-pixel factor S to create an effective response on the sub-pixel grid [m,n] such that [m=i, n=j/S=q], (3) and using the effective response to modulate the addition or deletion of tone of at least one sub-pixel; and
   c. combining the plurality of gray level dither patterns to create the dither matrix of resolution [m,n].

15. The method of claim 14 wherein the steps of generating each dither pattern for a corresponding gray level is repeated iteratively until the gray level is reached for each dither pattern.

16. The method of claim 14 wherein the pixel grid [p,q], sub-pixel grid [m,n] and super-resolution grid [i,j] substantially correspond as [i=m=S*p, j=n*S=q*S].

17. The method of claim 14 whereby in step b) at least one dither pattern is made using a donut filter.

18. The method of claim 14 further comprises the step of combining: a plurality dither patterns produced in accordance with steps (a) and (b), with one or more dither patterns produced on the pixel grid [p,q] using conventional dithering methods whereby said dither patterns are replicated in the [p] direction to create corresponding sub-pixel patterns on the [m,n] grid.

* * * * *

UNITED STATES PATENT AND TRADEMARK OFFICE
CERTIFICATE OF CORRECTION

PATENT NO. : 7,365,883 B2
APPLICATION NO. : 10/754175
DATED : April 29, 2008
INVENTOR(S) : Niranjan Damera-Venkata It is certified that error appears in the above-identified patent and that said Letters Patent is hereby corrected as shown below:

In column 10, line 57, in Claim 4, after "[q]" insert -- , --.

Signed and Sealed this

Twenty-ninth Day of July, 2008

JON W. DUDAS
*Director of the United States Patent and Trademark Office*